(12) United States Patent
Kawai

(10) Patent No.: US 10,810,149 B2
(45) Date of Patent: Oct. 20, 2020

(54) NON-TRANSITORY COMPUTER-READABLE MEDIUM HAVING INSTRUCTIONS, COMMUNICATION DEVICE, COMMUNICATION METHOD

(71) Applicant: BROTHER KOGYO KABUSHIKI KAISHA, Nagoya-shi, Aichi-ken (JP)

(72) Inventor: Sunao Kawai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 126 days.

(21) Appl. No.: 16/216,280

(22) Filed: Dec. 11, 2018

(65) Prior Publication Data

US 2019/0188172 A1 Jun. 20, 2019

(30) Foreign Application Priority Data

Dec. 14, 2017 (JP) .................... 2017-240023

(51) Int. Cl.
| | |
|---|---|
| G06F 13/38 | (2006.01) |
| G06F 13/14 | (2006.01) |
| H04L 29/08 | (2006.01) |
| H04L 12/46 | (2006.01) |
| G06F 3/12 | (2006.01) |
| H04L 12/24 | (2006.01) |

(52) U.S. Cl.
CPC .......... *G06F 13/385* (2013.01); *G06F 3/1229* (2013.01); *G06F 13/14* (2013.01); *H04L 12/46* (2013.01); *H04L 41/00* (2013.01); *H04L 67/325* (2013.01)

(58) Field of Classification Search
None
See application file for complete search history.

(56) References Cited

U.S. PATENT DOCUMENTS 6,314,476 B1* 11/2001 Ohara ............... G06F 3/1203
709/202

FOREIGN PATENT DOCUMENTS

| JP | 2000-293324 A | 10/2000 |
| JP | 2007-128122 A | 5/2007 |

* cited by examiner

*Primary Examiner* — Farley Abad
*Assistant Examiner* — Dayton Lewis-Taylor
(74) *Attorney, Agent, or Firm* — Scully, Scott, Murphy & Presser, PC

(57) ABSTRACT

A communication device perform operations includes: receiving, from a management device, a first management request which is a request for first status information; receiving, from the management device, a second management request which is a new request for the first status information; determining a transmission timing by using a first period between a reception timing of the first management request and a reception timing of the second management request, the transmission timing being a timing of transmitting to the function executing device a first status request for inquiring about the first status information through the second communication interface; and receiving, from the function executing device, information including the first status information in response to the first status request being transmitted to the function executing device through the second type communication interface in accordance with the determined transmission timing.

20 Claims, 7 Drawing Sheets

FIG. 4A

| T1 | NAME | OID | SCRIPT | VALUE | PERIODIC FLAG |
|---|---|---|---|---|---|
| 11 | DEVICE DESCRIPTION | X1 | INQUIRE MODELNAME | MFP-L100 | 0 |
| 12 | SERIALNUMBER | X2 | INQUIRE SERIALNUM | XXX12345 | 0 |
| 13 | ALERTLOCATION | X3 | INQUIRE STATUS | 1004 | 1 |
| 14 | SUPPLIESTYPE | X4 | INQUIRE SUPPLYTYPE | 3 | 0 |
| 15 | SUPPLIES DESCRIPTION1 | X5 | INQUIRE SUPPLYDESC1 | 90 | 0 |
| 16 | SUPPLIES DESCRIPTION2 | X6 | INQUIRE SUPPLYDESC2 | 80 | 0 |
| 17 | SUPPLIES DESCRIPTION3 | X7 | INQUIRE SUPPLYDESC3 | 85 | 0 |
| 18 | SUPPLIES DESCRIPTION4 | X8 | INQUIRE SUPPLYDESC4 | 60 | 0 |

FIG. 4B

| PACKET HEADER | |
|---|---|
| 11 | X1 |
| 12 | X2 |
| 14 | X4 |

FIG. 4C

| PACKET HEADER | | |
|---|---|---|
| 11 | X1 | MFP-L100 |
| 12 | X2 | XXX12345 |
| 14 | X4 | 3 |

| PERIODIC INTERVAL | PERIODIC DATE/TIME | T2 |
|---|---|---|
| 1h | 2017.Nov.2 11:05:12 | |

| | | | | | T3 |
|---|---|---|---|---|---|
| IP ADDRESS | PREVIOUS DATE/TIME | TIME INTERVAL (PERIOD DIFFERENCE) | ACQUISITION TIME | SET DATE/TIME | OID LIST |
| 31〜 192.168.0.10 | 2017.Nov.2 10:17:35 | 7h | 5min | 2017.Nov.2 17:12:35 | X1 X2 X4 |
| 32〜 192.168.0.20 | 2017.Nov.2 09:30:15 | 6h | 10min | 2017.Nov.2 15:20:15 | X1 X3 X5 |
| ⋮ | ⋮ | ⋮ | ⋮ | ⋮ | ⋮ |

NON-TRANSITORY COMPUTER-READABLE MEDIUM HAVING INSTRUCTIONS, COMMUNICATION DEVICE, COMMUNICATION METHOD

CROSS-REFERENCE TO RELATED APPLICATION

This application claims priority from Japanese Patent Application No. 2017-240023 filed on Dec. 14, 2017 the entire subject matter of which is incorporated herein by reference.

TECHNICAL FIELD

This disclosure relates to a communication device connected to a peripheral device and a management device and a computer program executed by a computer of the communication device.

BACKGROUND

In the background art, a system including a data processing device having a manager function, a data processing device having an agent function, and a printer locally connected to the data processing device having the agent function has been proposed. The data processing device having the agent function acquires a request from the data processing device having the manager function and acquires information appropriate for the request from the printer. As a response to the request, the data processing device having the agent function transmits the acquired information to the data processing device having the manager function.

SUMMARY

A communication device can be connected to a management device and a function executing device (for example, a printer) through different communication interfaces. The communication device receives information indicating a status of the function executing device from the function executing device through one communication interface. The communication device transmits information indicating the status of the function executing device to the management device through another communication interface. There is room for improvement with respect to a relationship between the reception timing of the information indicating the status of the function executing device from the function executing device and the transmission timing of the information indicating the status of the function executing device to the management device.

This specification discloses a technique capable of receiving information indicating a status of a function executing device from the function executing device at a timing appropriate for a transmission timing of information indicating the status of the function executing device to a management device.

This specification discloses, for example, the applied example, as follows.

According to a first applied example, a non-transitory computer-readable medium having instructions to control a computer of a communication device, which includes a first type communication interface and a second type communication interface, to perform operations. The operations includes receiving, from a management device, a first management request through the first type communication interface, the first management request being a request for first status information indicating a status of a function executing device, the function executing device being connected to the communication device through the second type communication interface; receiving, from the management device, a second management request through the first type communication interface after receiving the first management request from the management device, the second management request being a new request for the first status information; determining a transmission timing by using a first period between a reception timing of the first management request and a reception timing of the second management request, the transmission timing being a timing of transmitting, to the function executing device, a first status request for inquiring about the first status information through the second communication interface; and receiving, from the function executing device, information including the first status information in response to the first status request being transmitted to the function executing device through the second type communication interface in accordance with the determined transmission timing.

According to this configuration, when a communication device is connected to a management device and a function executing device through different communication interfaces, status information can be received from the function executing device at a timing appropriate for a reception timing of a request from the management device.

The technique disclosed in this specification can be realized in various aspects. For example, the technique can be realized in a form of a communication method, a communication device, a computer program for realizing functions of the method or device, a recording medium (for example, a non-transitory recording medium) on which the computer program is recorded, or the like.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 4A to 4F are explanatory diagrams of tables T1, T2, T3, and packets;

DETAILED DESCRIPTION

A. First Embodiment

Figure 1:
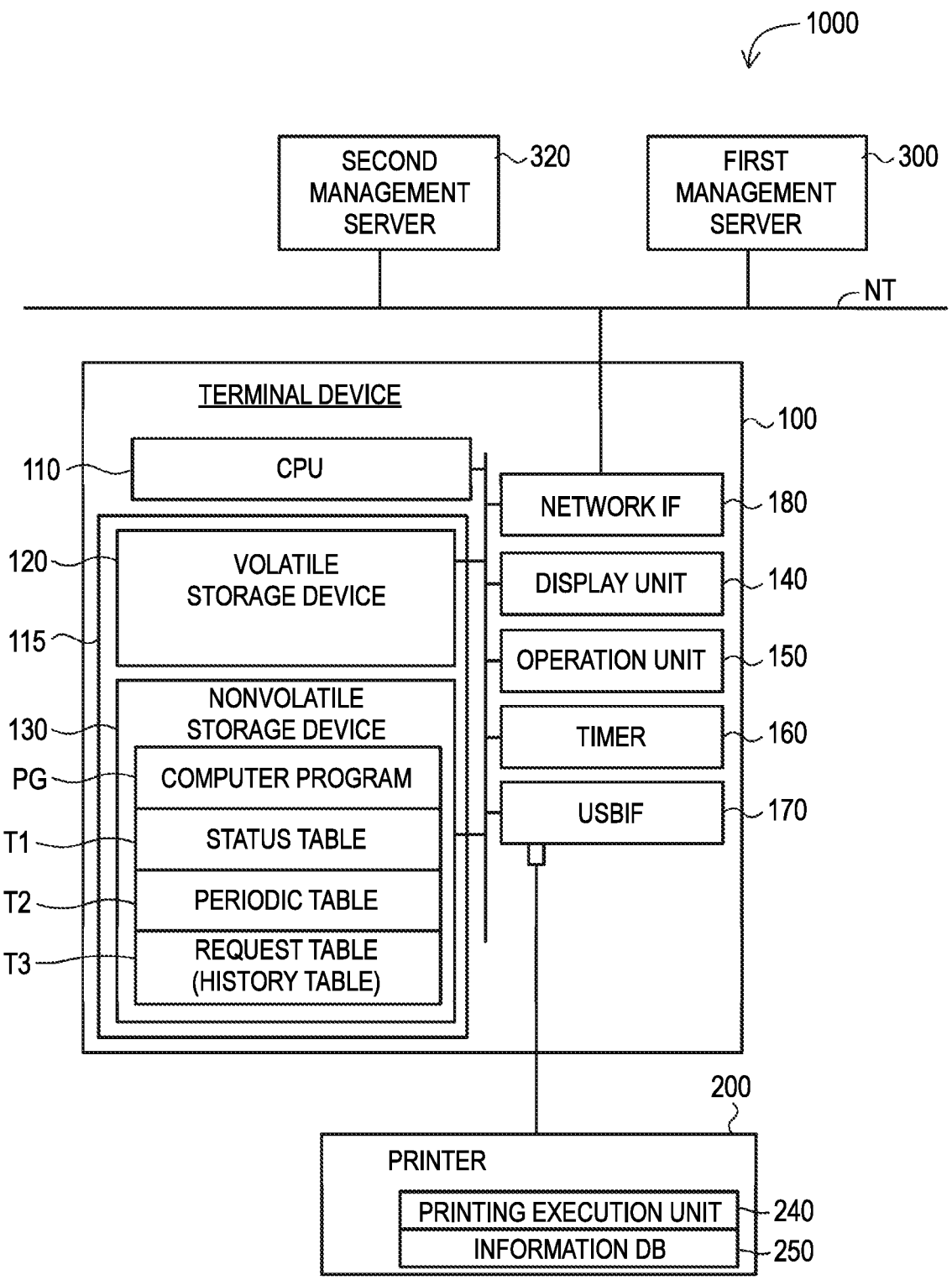
FIG. 1 is a block diagram illustrating a configuration of a system 1000.

FIG. 1 is a block diagram illustrating a configuration of a system 1000 according to this embodiment. The system 1000 includes a terminal device 100 which is an example of a communication device, a printer 200 which is an example of a function executing device, and management servers 300 and 320 which are examples of a management device. The terminal device 100 and the management servers 300 and 320 are connected to the local area network NT. These devices 100, 300, and 320 can communicate with each other via the local area network NT. The printer 200 can be connected to the terminal device 100 through a USB cable.

The terminal device 100 includes a CPU 110 as a controller of the terminal device 100, a storage device 115, a display unit 140 such as a liquid crystal display for displaying images, an operation unit 150 such as a keyboard and a mouse for acquiring an operation by a user, a timer 160, a USB interface (IF) 170, and a network interface (IF) 180. The storage device 115 includes a volatile storage device 120 such as a DRAM and a nonvolatile storage device 130 such as a hard disk or a flash memory. The timer 160 is a device measuring a current date/time. By using information from the timer 160, the CPU 110 can specify the current date/time.

The USB IF 170 is an interface for performing data communication in accordance with a USB (Universal Serial Bus) standard which is one of serial bus standards. The terminal device 100 can communicate with the printer 200 through the USB IF 170 with the USB IF 170 and the printer 200 connected to each other through the USB cable.

The network IF 180 is connected to the local area network NT. The network IF 180 is an interface for performing data communication in accordance with a communication standard using IP (Internet Protocol) as a network layer protocol of an OSI reference model. More specifically, the network IF 180 is a wired interface conforming to Ethernet (registered trademark) or a wireless interface conforming to the Wi-Fi standard (a standard in accordance with a standard 802.11 of IEEE (abbreviation of The Institute of Electrical and Electronics Engineers, Inc.) or a standard (for example, 802.11a, 11b, 11g, 11n, and the like) conforming to the standard 802.11).

The CPU 110 is an arithmetic device (processor) that performs data processing. The storage device 115 (at least one of the volatile storage device 120 and the nonvolatile storage device 130) provides a buffer area for temporarily storing various intermediate data generated when the CPU 110 performs processing. In this embodiment, the nonvolatile storage device 130 stores a computer program PG, a status table T1, a periodic table T2, and a request table T3.

The computer program PG is, for example, an application program provided in a form downloaded from a server (not illustrated) operated by a vender of the printer 200. Alternatively, the computer program PG may be provided in a form recorded in a CD-ROM or the like and may be provided while being stored in advance in the nonvolatile storage device 130 at the time of manufacturing the terminal device 100.

The status table T1 is a table for storing status information of the printer 200. The periodic table T2 is a table prescribing the periodical updating date/time of the status table T1. The request table T3 is a table (also referred to as a history table T3) for storing reception history of a SNMP (Simple Network Management Protocol) requests transmitted from the management servers 300 and 320. The details of the tables T1, T2, and T3 will be described later.

By executing the computer program PG, the CPU 110 executes a responding process and a timer process to be described later. As a result, the terminal device 100 receives the status information of the printer 200 connected to the USB IF 170 from the printer 200 and transmits the received status information to the management servers 300 and 320.

As described above, the printer 200 is a local printer connected to the terminal device 100 through a USB cable. The printer 200 is provided with a printing execution unit 240 and an information database (DB) 250.

For example, the printing execution unit 240 executes a printing process in accordance with a printing job received from the terminal device 100.

The printing process is a process of printing an image on a sheet of paper (an example of a printing medium) by using a coloring material (for example, toner or ink) according to a predetermined method (for example, a laser method or an inkjet method).

The information DB 250 is a database in which device information on the printer 200 is stored. The device information on the printer 200 includes information indicating a serial number, information indicating a model name, and status information indicating a status of the printer 200. The status information includes a plurality of items. For example, the plurality of items include information indicating the remaining amounts of consumable items in the printing execution unit 240, information indicating the number of times of replacement of consumables, information indicating the number of printed sheets, and information on errors in the printing execution unit 240. The remaining amount of the consumable item includes, for example, a remaining amount of a coloring material such as toner or ink and a remaining amount (remaining number of sheets) of paper of a paper tray of the printing execution unit 240. The number of times of replacement of consumable items includes, for example, the number of times of replacement of containers of coloring materials such as toner cartridges and ink cartridges. The number of printed sheets includes, for example, the cumulative number of printed sheets of the printing execution unit 240 and the number of printed sheets for each size of the paper. The information on the error includes, for example, information indicating whether or not there is an error (whether or not the printer operation is normal) and information indicating the type of error occurring.

The first management server 300 is a computer including a CPU and a memory (not illustrated) (hereinafter, also simply referred to as a management server 300). The management server 300 collects the status information of the printer in the system 1000, that is, the printer 200 via the local area network NT. In this embodiment, Simple Network Management Protocol (SNMP) is used to collect the status information. The management server 300 transmits the collected status information to, for example, a server (not illustrated) of a service provider that manages the system 1000 via the Internet. For example, based on the status information transmitted from the management server 300, the service provider grasps the number of printed sheets and the remaining amount of consumable items such as coloring materials of the printer in the system 1000 and performs charging or supplying of the coloring materials corresponding to the number of printed sheets. The configuration of the second management server 320 is the same as that of the first management server 300.

Figure 2:
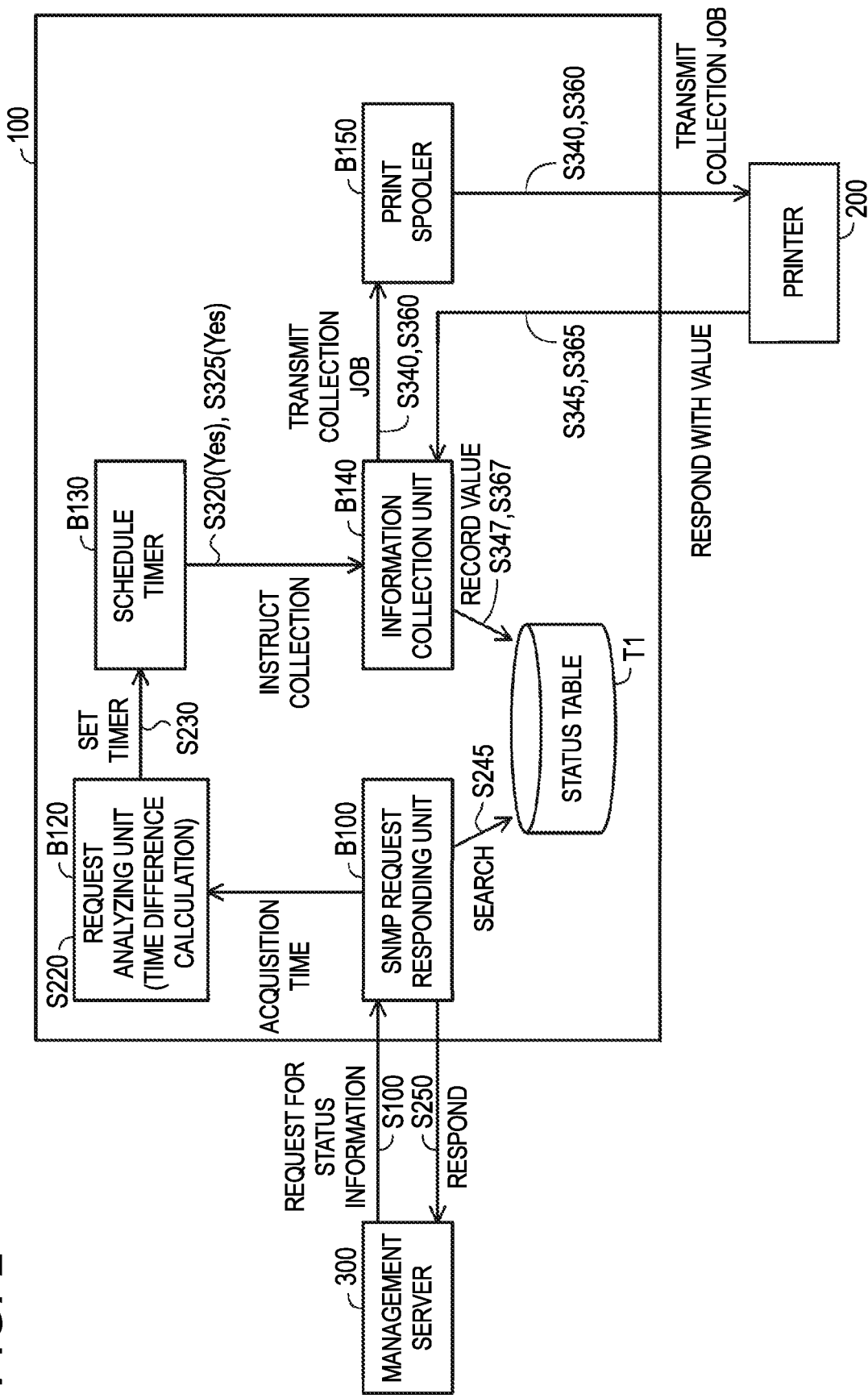
FIG. 2 is a schematic diagram illustrating operations of the system 1000.

FIG. 2 is a schematic diagram illustrating operations of the system 1000. In the figure, the terminal device 100, the printer 200, and the management server 300 are illustrated. The management server 300 has a function as an SNMP manager. The management server 300 collects the status information of the printer 200 periodically, for example, at a frequency of 1 to several times per day. In this embodiment, the printer 200 is not connected to the local area network NT (FIG. 1) but connected to the terminal device 100. The management server 300 transmits an SNMP request to the terminal device 100, not to the printer 200. In this embodiment, the management server 300 transmits a GetRequest packet of the SNMP to the terminal device 100.

Symbols indicated by combinations of the letter "S" and numbers in the figure indicate symbols of corresponding steps in the flowcharts of FIGS. 3 and 5 to be described later.

In FIG. 2, a block diagram illustrating functions of the terminal device 100 is illustrated. The CPU 110 of the terminal device 100 (FIG. 1) operates as each of an SNMP request responding unit B100, a request analyzing unit B120, a schedule timer B130, an information collection unit B140, and a print spooler B150.

The information collection unit B140 executes a process for transmitting a request for status information to the printer 200. In the request for the status information, for example, a command described by using PJL (Printer Job Language) is used. The information collection unit B140 supplies a printing job (also referred to as a collection job) including a command to the print spooler B150. The print spooler B150 transmits the collection job to the printer 200 in the same manner as a normal printing job. The printer 200 interprets the command included in the received collection job and transmits the requested information (herein, the value) to the terminal device 100. The information collection unit B140 stores the acquired information in the status table T1.

The terminal device 100 has a function as an SNMP agent. In response to the SNMP request from the management server 300, the request responding unit B100 of the terminal device 100 acquires the requested information from the status table T1 and transmits the acquired information to the terminal device 100.

The request analyzing unit B120 specifies the date/time when the SNMP request is received and calculates a period difference of the transmission timings of the repeated SNMP requests. By using the period difference, the request analyzing unit B120 determines the transmission timing when the request for status information is transmitted to the printer 200. The transmission timing is determined so that, when a new SNMP request from the management server 300 is received, new status information is acquired from the printer 200 (details will be described later).

The schedule timer B130 executes a process for allowing the information collection unit B140 to transmit the collection job according to the determined transmission timing.

In this manner, the CPU 110 of the terminal device 100 determines the transmission timing to transmit the collection job to the printer 200 by using the period difference in the reception timings of the SNMP requests from the management server 300. Therefore, the terminal device 100 can receive the status information from the printer 200 at a timing appropriate for the reception timing of the SNMP request from the management server 300. Similarly, even when the terminal device 100 receives the SNMP request from the second management server 320, the terminal device 100 receives the status information from the printer 200 at a timing appropriate for the reception timing of the SNMP request from the second management server 320. As will be described in detail later, the transmission timing when the collection job is to be transmitted to the printer 200 is set for each management device. Hereinafter, the details of the processing of the terminal device 100 will be described.

Figure 3:
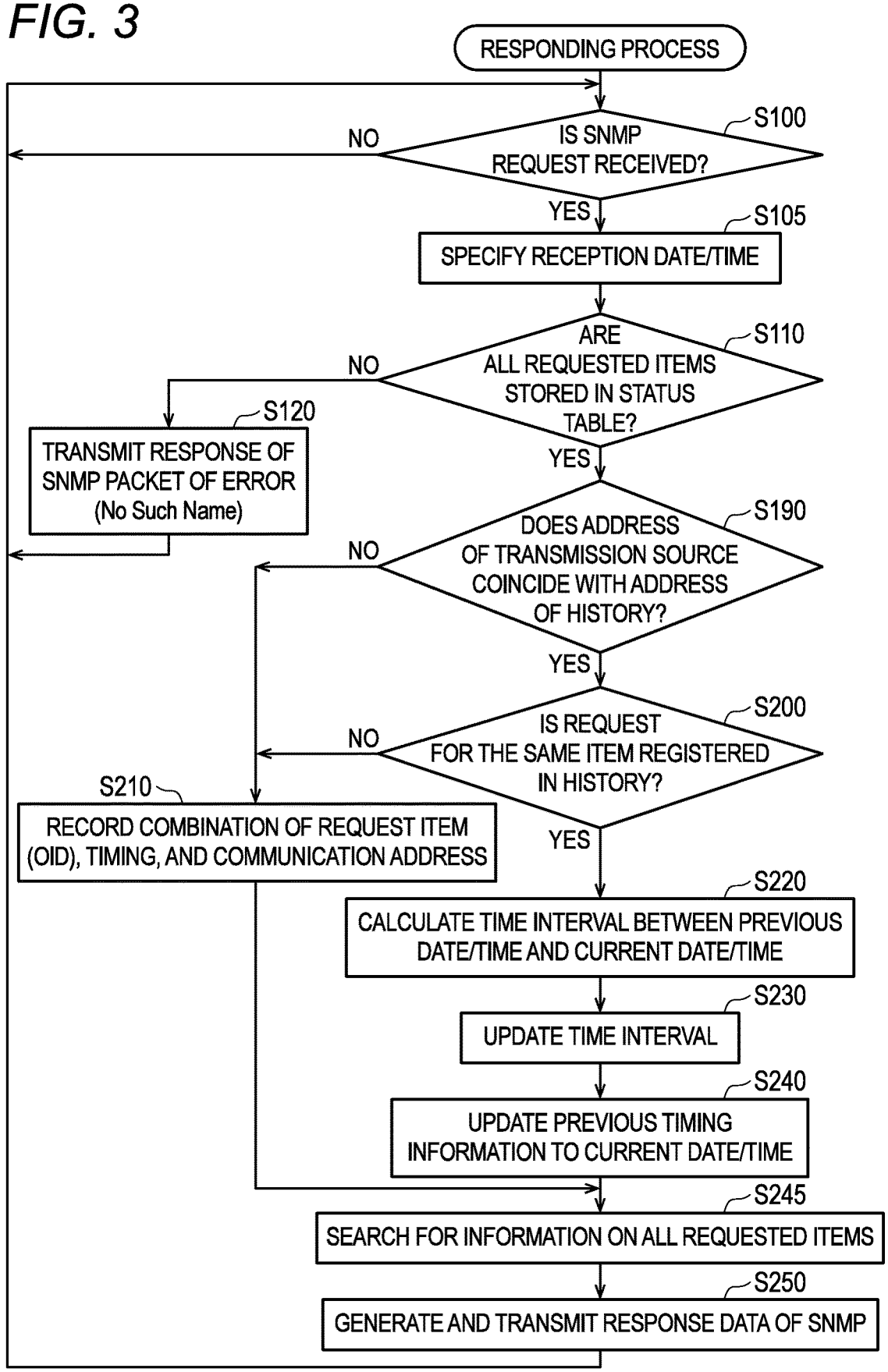
FIG. 3 is a flowchart illustrating an example of a responding process.

FIG. 3 is a flowchart illustrating an example of the responding process. The terminal device 100 (FIG. 1) functions as an SNMP agent and responds to the SNMP request from the management server (for example, the management server 300). The responding process is executed by the CPU 110 of the terminal device 100. When the power of the terminal device 100 is turned on, the CPU 110 starts the responding process of FIG. 3.

In S100, the CPU 110 determines whether or not an SNMP request was received. When the SNMP request was not received (S100: No), the CPU 110 waits until the SNMP request is received.

When an SNMP request is received (S100: Yes), the CPU 110 specifies a reception date/time of the SNMP by using the information from the timer 160 in S105. In S110, it is determined whether or not the information of all the items inquired by the SNMP request was stored in the status table T1. The SNMP request includes inquiries about N (N is an integer of 1 or more) items. Hereinafter, items included in the SNMP request are also referred to as request items.

FIG. 4A is an explanatory diagram illustrating an example of the status table T1. The status table T1 lists correspondence among item name, object ID, script, value, and periodic flag. The object ID is an identifier of an item. The script is a command inquiring the printer 200 about information of an item. The value indicates the latest information acquired from the printer 200. The value of each item is an example of the status information of the printer 200. The periodic flag indicates whether or not information is periodically updated. "Periodic Flag=1" indicates items of which information is periodically updated independently of the period difference of requests repeatedly from the management server. "Periodic Flag=Zero" indicates items other than the items of which information is periodically updated. Hereinafter, an item associated with the periodic flag "1" is also referred to as a specific item.

For managing the status of the printer 200, predetermined M items (M is an integer of 1 or more) are used (also referred to as management items). The name, object ID, script, and periodic flag of each of M management items are predetermined by the vendor of the printer 200. The status table T1 stores the name, the object ID, the script, and the periodic flag of each of the M management items in advance. The value of each item is updated by a timer process to be described later. The database that stores the information managed by the SNMP agent as in the status table T1 is also called MIB (Management Information Base).

In the example of FIG. 4A, the status table T1 stores information on eight items 11 to 18. The first item 11 indicates the model name, the second item 12 indicates the serial number, the third item 13 indicates the operation status, the fourth item 14 indicates the type of the coloring material, and the fifth to eighth items 15 to 18 indicate the remaining amounts of consumable items (for example, coloring materials) used in the printer 200, respectively. The operation status of the third item 13 indicates one of a plurality of predetermined operation statuses (for example, "standby", "under printing", "out of coloring material", and "paper jam").

The management servers 300 and 320 periodically transmit an SNMP request for inquiring about information such as the remaining amounts of consumables to the terminal device 100. FIG. 4B is an explanatory diagram illustrating an example of a packet of an SNMP request from the management server (for example, the management server 300). In the figure, an example of a packet for one-time request is illustrated. As illustrated in the figure, the request packet includes a packet header and data indicating an object ID of a request item which is an item to be inquired. As illustrated in the figure, one-time request can query a plurality of request items (in the example of FIG. 4B, the number of request items is three).

Figures 4D, 4E, 4F:
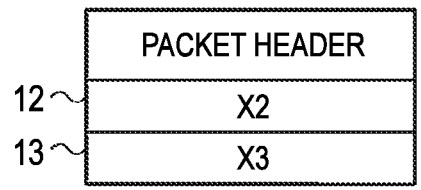

The management servers 300 and 320 can transmit the SNMP request to the terminal device 100 in accordance with a user's instruction. FIG. 4D is an explanatory diagram illustrating an example of a packet of the SNMP request transmitted in accordance with a user's instruction. For example, in order to specify contents of malfunction of the printer 200, the user causes the management servers 300 and 320 to transmit an SNMP request for inquiring about an operation status of the third item 13. In this manner, the periodic flag of the item (for example, the third item 13) which is highly likely to be requested at an irregular timing is set to "1".

In this embodiment, M items stored in advance in the status table T1 are used as candidates for the request items of the SNMP requests from an appropriate management server. When information of at least one request item included in the SNMP request is not stored in the status table T1 (in FIG. 3, S110: No), the transmission source of the SNMP request is not treated as an appropriate management server, and the responding process is ended. More specifically, in S120, the CPU 110 transmits a response notifying that an error has occurred to the device of the transmission source. In this embodiment, the CPU 110 transmits a packet of a GetResponse of the SNMP to the device of the transmission source. Herein, the error status of the packet of GetResponse is set to "noSuchName" indicating that the object ID of the request item does not exist. After S120, the CPU 110 returns to S100 and waits until a new SNMP request is received.

When the information on all the request items included in the SNMP request was stored in the status table T1 (FIG. 3, S110: Yes), the transmission source of the SNMP request is treated as an appropriate management server, and the responding process proceeds. In this embodiment, both the SNMP request from the first management server 300 and the SNMP request from the second management server 320 satisfy the condition of S110.

When the determination result in S110 is Yes, in S190, the CPU 110 determines whether or not the communication address of the transmission source coincides with the communication address which was stored in the history table T3. In this embodiment, the IP address is used as a communication address. Hereinafter, the communication address of the transmission source of the SNMP request is also called a request address.

FIG. 4F is an explanatory diagram illustrating an example of the history table T3. As will be described later, information on the SNMP request received from an appropriate management server is stored in the history table T3. More specifically, the history table T3 lists the history of the correspondence among IP address, previous date/time, period difference (also referred to as a time interval), acquisition time, set date/time, and a list of object IDs. Hereinafter, each correspondence stored in the history table T3 is also referred to as request history information. The IP address is an IP address of the transmission source of the SNMP request. The previous date/time is a date/time when the SNMP request was received last time. The acquisition time is a time required to acquire the status information from the printer 200. When the total number of items to be acquired is plural and information on a plurality of items is sequentially received from the printer 200, the acquisition time is determined based on the timing when the information on the last received item is received. The set date/time is a date/time when the collection job is to be transmitted to the printer 200. The time interval is a time width of the period between the reception timing of the previous SNMP request (that is, reception timing of the latest SNMP request) and the reception timing of the SNMP request just before the previous SNMP request. The list of object IDs is a list of the object IDs of the request items included in the SNMP request.

Even if the transmission source is an appropriate management server, when the current SNMP request is the first SNMP request from the transmission source, the request history information on the current SNMP request was not stored in the history table T3. The request address does not coincide with the communication address of any request history information which was stored in the history table T3. That is, the request history information of which communication address is the same as the request address was not stored in the history table T3. In this case (S190: No), in S210, the CPU 110 adds the request history information on the current SNMP request to the history table T3, and the process proceeds to S245. Herein, the IP address is set to the IP address of the transmission source of the SNMP request. The previous date/time is set to a date/time of receiving the current SNMP request specified in S105. The time interval is set to a default value (for example, 8 hours) that is a predetermined value. The acquisition time is set to a predetermined initial value (for example, zero minute). The set date/time is set to a date/time obtained by adding the time interval to the previous date/time. The list of object IDs is set to the list of object IDs of all the request items included in the SNMP request. Normally, the IP address differs for each management server. Accordingly, the history table T3 stores different request history information for each management server. In the example of FIG. 4F, the first request history information 31 is information of the first management server 300, and the second request history information 32 is information of the second management server 320.

When the request address coincides with the communication address of any request history information stored in the history table T3 (S190: Yes), that is, when the request history information of which communication address is the same as the communication address of the transmission source is stored in the history table T3, the process proceeds to S200. In S200, the CPU 110 searches for the request history information of which communication address is the same as the request address from the history table T3 and determines whether or not the list of the object IDs of the found request history information coincides with the combination of the object IDs of the request items. In some cases, one management server may inquire the terminal device 100 about different items at different cycles. In this case, the combination of the object IDs of the request items may be different from the list of the object IDs corresponding to the request addresses in the history table T3.

Hereinafter, among the request history information stored in the history table T3, the request history information of which communication address is the same as the request address and of which list of object IDs coincides with the combination of the object IDs of the request items is referred to as first target history information.

In S200, the CPU 110 determines whether or not the list of the object IDs coinciding with the combination of the object IDs of the request items is recorded in the request history information of which communication address is the same as the request address by referring to the history table T3. "The determination result of S190 is Yes and the determination result of S200 is Yes" indicates that the history table T3 stores the first target history information.

When the determination result of S200 is No, in S210, the CPU 110 adds the request history information on the current SNMP request to the history table T3, and the process proceeds to S245. As described above, in this embodiment, the history table T3 can store a plurality of request history information including the same IP address and different lists of object IDs. That is, the history table T3 stores request history information for each combination of the list of items and the IP address.

When the determination result of S200 is Yes, in S220, the CPU 110 specifies the previous date/time of the first target history information by referring to the history table T3. Then, the CPU 110 calculates the time interval which is the time width of the period between the previous date/time and the date/time when the current SNMP request was received. The current date/time is the date/time specified in S105. In S230, the CPU 110 registers the time interval calculated in S220 in the time interval of the first target history information in the history table T3. As a result, the time interval of the first target history information is updated. In S240, the CPU 110 updates the previous date/time of the first target history information in the history table T3 to the current date/time.

In S245, the CPU 110 searches for information on all the request items of the SNMP request by referring to the status table T1 and acquires the found information. In S250, the CPU 110 transmits the SNMP response including the acquired information to the transmission source (for example, the management server 300) of the SNMP request. In this embodiment, the CPU 110 transmits a GetResponse packet of the SNMP to the transmission source.

FIG. 4C is an explanatory diagram illustrating an example of a packet of the SNMP response from the terminal device 100. This response packet illustrates an example of a response to the request packet of FIG. 4B. As illustrated in the figure, this response packet (herein, the packet of GetResponse) includes data indicating the object ID and corresponding information with respect to all request items included in the request packet.

After the process of S250 (that is, the transmission of the SNMP response), the CPU 110 returns to S100 and waits until a new SNMP request is received. As described above, the CPU 110 continuously performs the responding process of FIG. 3.

Figure 5:
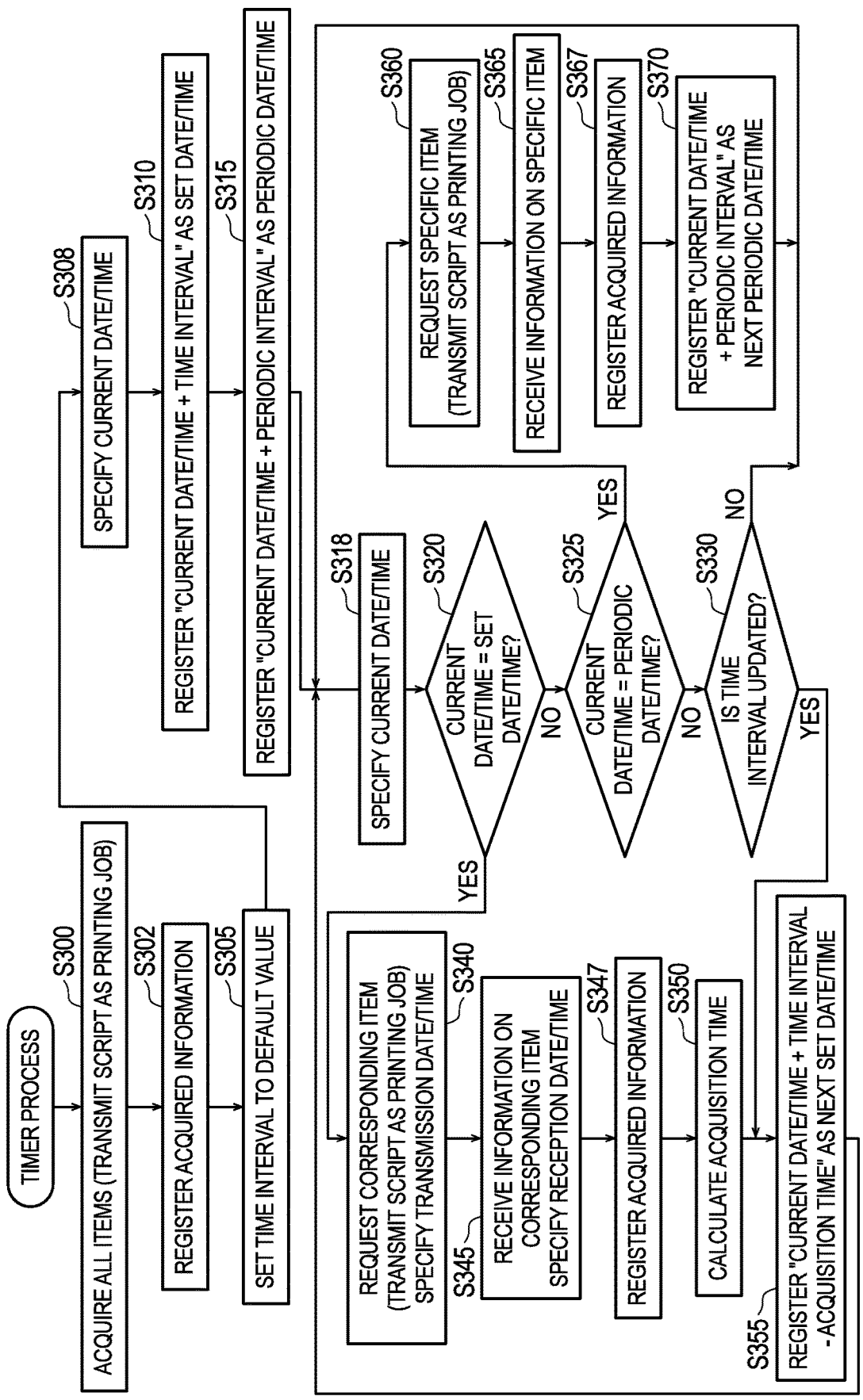
FIG. 5 is a flowchart illustrating an example of a timer process.

FIG. 5 is a flowchart illustrating an example of a timer process. This timer process is executed by the CPU 110 of the terminal device 100. When power of the terminal device 100 is turned on, the CPU 110 starts the timer process of FIG. 5. The CPU 110 executes the timer process in parallel with the responding process of FIG. 3.

In S300, the CPU 110 acquires, from the printer 200, all pieces of information of the M management items defined by the status table T1 (FIG. 4A). In this embodiment, the CPU 110 specifies the script of each management item by referring to the status table T1. Then, the CPU 110 generates the collection job including the script of each management item, and supplies the generated collection job to the print spooler B150 (FIG. 2). The CPU 110 operating as the print spooler B150 transmits the collection job to the printer 200. The printer 200 interprets the script included in the received collection job and transmits the requested information (herein, data indicating the value of each management item) to the terminal device 100. The CPU 110 acquires the information from the printer 200. In S302, the CPU 110 registers the acquired information in the status table T1. As a result, the values of all the items in the status table T1 are updated.

In S305, the CPU 110 sets the time interval of updating of the management item to a default value that is a predetermined value. This time interval is used as a default value in S210 of FIG. 3. In S308, the CPU 110 specifies the current date/time by using the information from the timer 160. In S310, the CPU 110 sets the set date/time when the collection job is to be transmitted to the printer 200 to the date/time obtained by adding the time interval to the current date/time. The set date/time indicates the date/time when the collection job of the item corresponding to the periodic flag "zero" (FIG. 4A) is to be transmitted to the printer 200. When the history table T3 (FIG. 4F) stores the request history information, the CPU 110 registers the date/time obtained by adding the time interval to the current date/time in the set date/time of each request history information.

In S315, the CPU 110 sets the periodic date/time to the date/time obtained by adding the periodic interval to the current date/time. The periodic date/time is the date/time when the collection job of the item corresponding to the periodic flag "1" (FIG. 4A) is to be transmitted to the printer 200. The periodic interval is predetermined and is defined by the periodic table T2 (FIG. 1). FIG. 4E is an explanatory diagram illustrating an example of the periodic table T2. The periodic table T2 lists periodic intervals and periodic dates/times. The periodic interval is predetermined (1 hour in the example of FIG. 4E). The CPU 110 registers the calculated periodic date/time in the periodic date/time of the periodic table T2.

In S318, the CPU 110 specifies the current date/time by using the information from the timer 160. In S320, the CPU 110 determines whether or not the current date/time is the sett date/time. In this embodiment, the CPU 110 compares the current date/time with the set date/time of each request history information stored in the history table T3 (FIG. 4F). When the current date/time is the same as the set date/time of any request history information (S320: Yes), the CPU 110 executes steps S340 to S355 for updating the information of the object ID of the request history information of which set date/time is the same as the current date/time. Hereinafter, the request history information of which set date/time is the same as the current date/time is referred to as second target history information. The item specified by the list of object IDs of the second target history information is referred to as a target item.

In S340, the CPU 110 generates the collection job including the script of each target item, and supplies the generated collection job to the print spooler B150 (FIG. 2). The CPU 110 operating as the print spooler B150 transmits the collection job to the printer 200. The CPU 110 specifies the date/time (referred to as transmission date/time) when the collection job was transmitted to the printer 200, by using the information from the timer 160. The printer 200 interprets the script included in the received collection job and transmits the requested information to the terminal device 100. In S345, the CPU 110 acquires information on each target item from the printer 200. The CPU 110 specifies the date/time (referred to as reception date/time) when the information from the printer 200 is received, by using the information from the timer 160. In S347, the CPU 110 registers the acquired information in the value of the corresponding target item in the status table T1 (FIG. 4A). As a result, the values of all target items in the status table T1 are updated.

In S350, the CPU 110 calculates an acquisition time which is a time width of a period between the transmission date/time and the reception date/time. The acquisition time is calculated by "reception date/time−transmission date/time". The CPU 110 registers the calculated acquisition time in the acquisition time of the second target history information in the history table T3 (FIG. 4F). In S355, the CPU 110 calculates a new set date/time. The set date/time is calculated by "current date/time+time interval−acquisition time". The time interval is a time interval of the second target history information in the history table T3 (FIG. 4F). The CPU 110 registers the calculated set date/time in the set date/time of the second target history information in the new history table T3. Then, the CPU 110 proceeds to S318.

When the determination result of S320 is No, in S325, by referring to the periodic table T2 (FIG. 4E) the CPU 110 specifies the periodic date/time, and determines whether or not the current date/time is the periodic date/time. When the current date/time is the same as the periodic date/time (S325: Yes), the CPU 110 executes steps S360 to S370 for updating the information of the specific item.

In S360, the CPU 110 generates the collection job including the script of each specific item, and supplies the generated collection job to the print spooler B150 (FIG. 2). The CPU 110 operating as the print spooler B150 transmits the collection job to the printer 200. The printer 200 interprets the script included in the received collection job and transmits the requested information to the terminal device 100. In S365, the CPU 110 acquires information on each specific item from the printer 200. In S367, the CPU 110 registers the acquired information in the value of the corresponding specific item in the status table T1 (FIG. 4A). As a result, the values of all the specific items in the status table T1 are updated.

In S370, the CPU 110 calculates a new periodic date/time by adding the periodic interval to the current date/time. The CPU 110 registers the calculated periodic date/time in the periodic table T2 (FIG. 4E). Then, the CPU 110 proceeds to S318.

When the determination result in S325 is No, in S330, the CPU 110 determines whether or not the time interval of at least one request history information was updated by referring to the history table T3 (FIG. 4F). The updating of the time interval is performed in S230 of FIG. 3. When the time interval was updated after the set date/time of the history table T3 was set, the CPU 110 determines that the time interval was updated. As described later, the set date/time of the history table T3 is updated by using the updated time interval.

When the time interval was not updated after the set date/time was updated, the CPU 110 determines that the time interval was not updated.

When the time interval of at least one request history information in the history table T3 was updated (S330: Yes), the CPU 110 updates the set date/time corresponding to the updated time interval of the history table T3 in S355. The CPU 110 calculates a new set date/time by using the updated time interval and registers the calculated set date/time in the set date/time corresponding to the updated time interval. Then, the CPU 110 proceeds to S318.

When the time interval of all the request history information in the history table T3 was not updated (S330: No), the CPU 110 proceeds to S318. As described above, the CPU 110 updates the information of the target item in accordance with the set timing, and updates the information of the specific item in accordance with the periodic timing.

As described above, the terminal device 100 (FIG. 1) is provided with the network IF 180 and the USB IF 170. The printer 200 is connected to the terminal device 100 through the USB IF 170. In S100 of FIG. 3, the CPU 110 receives an SNMP request which is a request for the status information of the printer 200 from the management server (for example, the management server 300, 320) through the network IF 180. As described above, the management server periodically transmits the SNMP request to the terminal device 100. The process of FIG. 3 is repeatedly executed. Accordingly, the CPU 110 periodically receives the SNMP request from the same management server in S100. For example, after receiving the first SNMP request, the CPU 110 receives the second SNMP request, which is a new request of the same status information, from the same management server. In S355 of FIG. 5, the CPU 110 determines the transmission timing (more specifically, the set date/time) for transmitting the collection job to the printer 200 through the USB IF 170 by using the first period between the reception timing of the first SNMP request and the reception timing of the second SNMP request. Herein, the collection job is an example of a request for inquiring about the target item of the SNMP request from the management server. In S320 and S340 of FIG. 5, the collection job is transmitted to the printer 200 in accordance with the determined set date/time. The printer 200 transmits the information of the target item to the terminal device 100 responding to the received collection job. In S345, the CPU 110 receives the information of the target item from the printer 200.

In this manner, the terminal device 100 is connected to the management server (for example, the management servers 300 and 320) and the printer 200 through different communication interfaces 170 and 180, respectively. In S355 of FIG. 5, the transmission timing of the collection job is determined to be a timing appropriate for the time interval of repeated SNMP requests from the management server. Therefore, the terminal device 100 can receive the information of the target item from the printer 200 at a timing appropriate for the reception timing of the SNMP request from the management server. For example, the CPU 110 can determine the transmission timing so that the latest status information can be received from the printer 200 at substantially the same timing as the reception timing of the SNMP request from the management server 300. Therefore, as compared with a case where the terminal device 100 transmits the collection job to the printer 200 in response to the reception of the SNMP request from the management server 300, the terminal device 100 can promptly transmit new status information to the management server 300.

The process of FIG. 3 is repeatedly executed. Therefore, after receiving the second SNMP request, the CPU 110 receives a third SNMP request which is a new request of the same status information from the same management server. Then, in S230, the time interval is updated. The process of FIG. 5 is repeatedly executed. When the third management request is received, since the time interval is updated as described above, the determination result of S330 in FIG. 5 becomes Yes. As a result, when the third management request is received, in S355 of FIG. 5, the CPU 110 determines the transmission timing by using a second period between the reception timing of the second management request and the reception timing of the third management request. In this manner, when a new SNMP request is received, since the transmission timing is updated, the terminal device 100 can receive the status information from the printer 200 at an appropriate timing.

In S340 and S345 of FIG. 5, the CPU 110 specifies an acquisition period which is a period from the transmission time of the collection job to the printer 200 to the reception time of the status information from the printer 200 (specifically, a period from the transmission date/time of the collection job to the reception date/time of the information of the corresponding item). In S350 and S355, the CPU 110 determines the transmission timing (that is, the new set date/time) to be a timing earlier by the time width (that is, the acquisition time) of the acquisition period than the timing specified based on the time interval. More specifically, the new transmission timing is set to "current date/time+time interval−acquisition time". As a result, even when the acquisition time is long, the terminal device 100 can receive the status information from the printer 200 at an appropriate timing. For example, the terminal device 100 can complete the acquisition of the status information from the printer 200 at about the same timing as the reception timing of the SNMP request from the management server 300. Therefore, the terminal device 100 can promptly transmit the new status information to the management server 300.

In S320 and S340 of FIG. 5, the CPU 110 executes a process for transmitting the collection job to the printer 200 according to the transmission timing determined in S355. Therefore, the terminal device 100 can receive the status information from the printer 200 at an appropriate timing.

In S347 of FIG. 5, the CPU 110 stores the information received from the printer 200 in the storage device 115 (herein, the status table T1 of the nonvolatile storage device 130). In steps S245 and S250 of FIG. 3, the CPU 110 transmits the information of the target item of the SNMP request among the information which was stored in the storage device 115 (herein, the status table T1 of the nonvolatile storage device 130) to the management server (for example, the management server 300). Therefore, the CPU 110 can transmit the status information appropriate for the SNMP request from the management server to the management server.

In the process of FIG. 3, when receiving the SNMP request, the CPU 110 determines whether or not the transmission source of the SNMP request is a management device that satisfies a specific condition (herein, the condition of S110) for replying with the status information. When the condition of S110 is not satisfied (S110: No), the CPU 110 does not transmit the status information to the transmission source. When the condition of S110 is satisfied (S110: Yes), the CPU 110 transmits the information of the target item of the SNMP request among the information which was stored in the storage device 115 (herein, the status table T1 of the nonvolatile storage device 130) to the management device (for example, the management server 300). Therefore, the status information is prevented from being transmitted to a device different from the appropriate management device. For example, the terminal device 100 may receive an SNMP request from a network management device that manages a network device such as a router. In such a case, the terminal device 100 is prevented from transmitting the status information of the printer 200 to the network management device.

In S110 of FIG. 3, the CPU 110 interprets the SNMP request to determine whether or not the transmission source of the SNMP request is a management device satisfying a specific condition. Therefore, an appropriate determination is possible. In this embodiment, the condition of S110 is that the object IDs of all the target items of the SNMP request are included in the predetermined candidates.

In S325 and S360 of FIG. 5, the CPU 110 periodically executes a process for transmitting the collection job for inquiring about the status of the specific item to the printer 200 independently of the transmission timing (herein, set date/time) determined in S355. In S365, the CPU 110 receives, from the printer 200, the status information indicating the status of the specific item transmitted by the printer 200 in accordance with the collection job of S360. Therefore, the terminal device 100 can appropriately prepare new information indicating the status of the specific item. As described with reference to FIG. 4A, among the plurality of items 11 to 18 of the status table T1, the periodic flag of the specific item (herein, the third item 13) that can be requested at an irregular timing is set to "1". Therefore, the value of the specific item 13 is periodically updated, independently of the set date/time determined in S355. As a result, when the management servers 300 and 320 transmit the SNMP request to the terminal device 100 at an irregular timing in accordance with a user's instruction, the terminal device 100 transmits the new information of the specific item to the management servers 300 and 320.

As described with reference to S190 and S210 in FIG. 3, and FIG. 4F, the CPU 110 stores different request history information for each management server in the history table T3. That is, the set date/time, which is the transmission timing when the collection job is to be transmitted, is determined for each management server. For example, in the embodiment of FIG. 4F, the set date/time of the first request history information 31 indicates the transmission timing of the collection job requesting the printer 200 for the information on the items requested by the first management server 300. The set date/time of the second request history information 32 indicates the transmission timing of the collection job requesting the printer 200 for the information on the items requested by the second management server 320 different from the first management server 300. As a result, a process for acquiring information from the printer 200 is executed at a timing appropriate for each of the first management server 300 and the second management server 320. As illustrated in FIG. 4F, the transmission timing (in this case, the set date/time) for the second management server 320 can be determined at a timing different from the transmission timing for the first management server 300.

B. Second Embodiment

Figure 6:
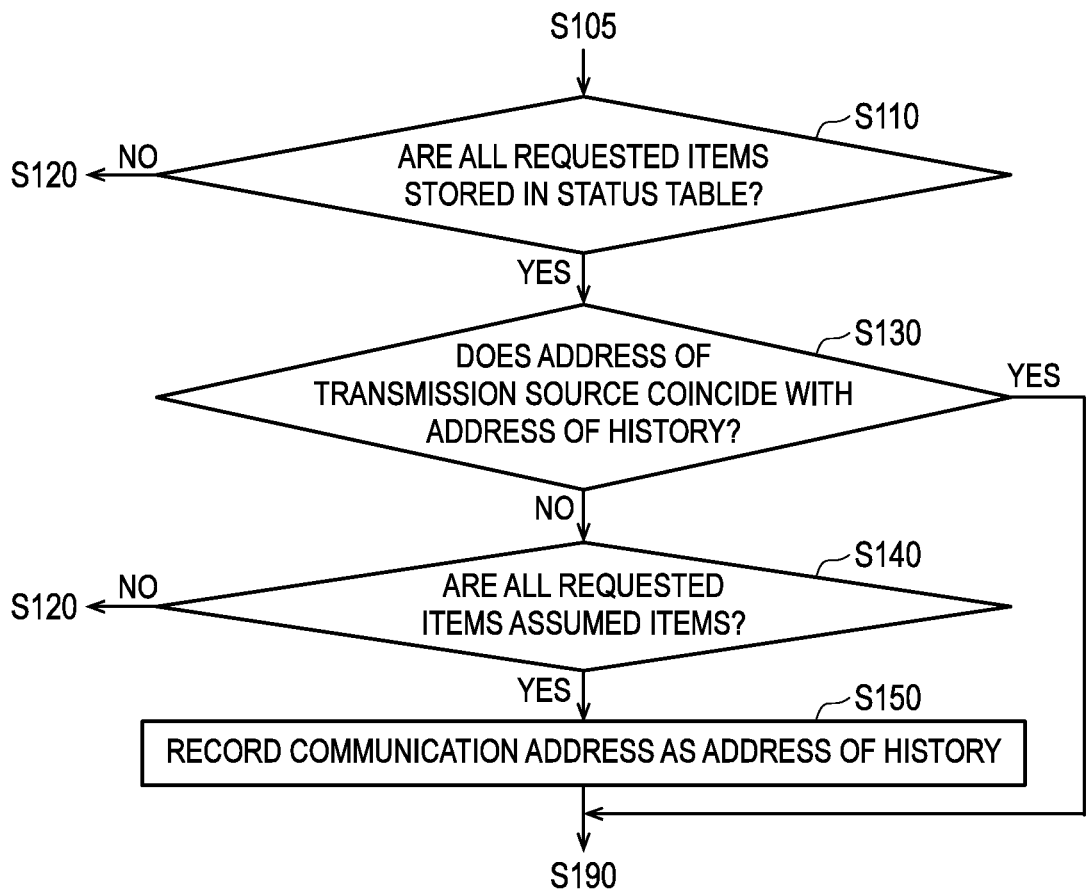
FIG. 6 is a flowchart illustrating another example of a responding process.

FIG. 6 is a flowchart illustrating another embodiment of a responding process. In FIG. 6, a portion including the changed portions from the embodiment of FIG. 3 is illustrated. The difference from the embodiment of FIG. 3 is that the condition for replying with the status information to the transmission source of the SNMP request is different.

When the determination result of S110 is Yes, in S130, the CPU 110 determines whether or not the communication address of the transmission source of the SNMP request coincides with the communication address which was stored in the history table T3. This determination is performed in the same manner as in S190 of FIG. 3.

When the request history information on the current SNMP request was not stored in the history table T3, the determination result of S130 is No. For example, when the current SNMP request is the first SNMP request from the transmission source, the determination result of S130 is No. When the determination result in S130 is No, in S140, the CPU 110 determines whether or not the combination of the request items included in the SNMP request coincides with the assumed combination that is a predetermined combination. The assumed combination may be, for example, a combination of object IDs of packets illustrated in FIG. 4B. When at least one request item is not included in the assumed combination (S140: No), the CPU 110 proceeds to S120 (FIG. 3) and transmits, to the device of the transmission source, a response notifying that the error has occurred. In this case, the request history information on the current SNMP request is not stored in the history table T3 (FIG. 4F).

When the combination of the request items coincides with the assumed combination (S140: Yes), in S150, the CPU 110 adds the request history information including the communication address of the transmission source of the SNMP request in the history table T3 (FIG. 4F). The request history information added in S150 includes only the IP address as valid information. Other information such as the previous date/time is registered in S210 (FIG. 3) which will be described later. Therefore, information other than the IP address may be blank. In response to the completion of S150, the process proceeds to S190 (FIG. 3).

When the request history information on the current SNMP request was stored in the history table T3, the determination result of S130 is Yes. In this case, the CPU 110 proceeds to S190 (FIG. 3).

The process in and after S190 is the same as the process of the corresponding portion of the embodiment of FIG. 3. Similarly to the embodiment of FIG. 3, the CPU 110 adds (S210) or updates (S220 to S240) the request history information on the current SNMP request. Then, the CPU 110 transmits an SNMP response including information on all the request items of the SNMP request to the transmission source (for example, the management server 300) of the SNMP request (S245 and S250).

As described above, in this embodiment, when the combination of the request items of the SNMP request is different from the assumed combination (S 140: No), the request history information on the SNMP request is not registered in the history table T3, and any reply with the SNMP response including the status information of the printer 200 is not transmitted to the transmission source of the SNMP request. When the combination of the request items of the SNMP request is the same as the assumed combination (S140: Yes), the request history information on the SNMP request is registered in the history table T3 (S150), and a reply with the SNMP response including the status information of the printer 200 is transmitted to the transmission source of the SNMP request (S245 and S250). In this manner, the condition for returning the SNMP response including the status information includes that the combination of the request items of the SNMP request is the same as the predetermined assumed combination. Therefore, the terminal device 100 can provide the status information only to an appropriate management device that transmits the SNMP request of the assumed combination request item.

By interpreting the SNMP request, the CPU 110 determines whether or not the condition of S140 is satisfied. Therefore, appropriate determination is possible.

C. Third Embodiment

Figure 7:
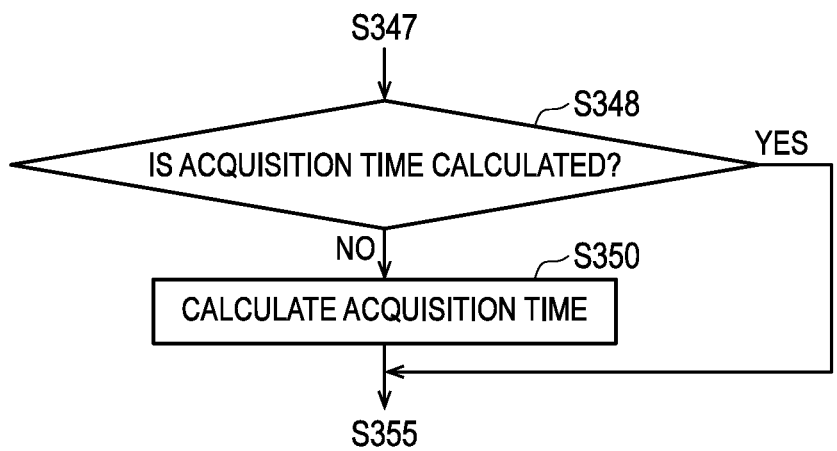
FIG. 7 is a flowchart illustrating another example of a timer process.

FIG. 7 is a flowchart illustrating another embodiment of the timer process. In FIG. 7, a portion including the changed portions from the embodiment of FIG. 5 is illustrated. Only the difference from the embodiment of FIG. 5 is that the acquisition time once calculated is not updated and is continuously used.

After S347, in S348, the CPU 110 determines whether or not the acquisition time of the second target history information was calculated. In this embodiment, the CPU 110 refers to the acquisition time of the second target history information in the history table T3 (FIG. 4F), and when the acquisition time was registered, the CPU 110 determines that the acquisition time was calculated.

When the acquisition time was not calculated (S348: No), the CPU 110 calculates the acquisition time in S350. S350 is the same as S350 in FIG. 5. After S350, the CPU 110 proceeds to S355 (FIG. 5).

When the acquisition time was calculated (S348: Yes), the CPU 110 skips S350 and proceeds to S355. As a result, the acquisition time of the second target history information is maintained without being updated.

Generally, the response speed of printer 200 to the collection jobs is approximately constant. Therefore, the calculated acquisition time may be continuously used without being updated. Also in this case, the terminal device 100 can receive the status information from the printer 200 at an appropriate timing.

D. Modified Examples (1) The responding process and the timer process may be various other processes instead of the above-described process. For example, the time interval of the SNMP request repeatedly transmitted by the management device (for example, the management servers 300 and 320) is usually constant. Therefore, after the time interval of the request history information in the history table T3 (FIG. 4F) is set in S230 of FIG. 3, updating of the time interval of the same request history information (S230) may be omitted.

(2) The set date/time calculated in S355 of FIG. 5 may be earlier than "current date/time+time interval−acquisition time". For example, "set date/time=current date/time+time interval−acquisition time−Tx" (Tx is a predetermined positive time (for example, 10 minutes)). The time interval used for determining the set date/time may be an average value of a plurality of time intervals specified in response to plural times of SNMP request reception. When the change amount of the time interval is equal to or less than the predetermined threshold value, updating of the time interval (FIG. 3: S230) may be omitted.

The acquisition time may be omitted from the calculation of the set date/time in S355 of FIG. 5. For example, the set date/time may be "current date/time+time interval" or may be "current date/time+time interval−Tx". When a response speed of the collection job by the printer 200 is sufficiently fast, even when the acquisition time is omitted, an appropriate set date/time can be determined.

(3) In the embodiment of FIG. 6, S110 may be omitted. In this case, in the status table T1 (FIG. 4A), only the information on the items of the assumed combination used in S140 and the information on the specific item used in S360 to S367 of FIG. 5 may be registered.

(4) The specific condition that is a condition for replying with an SNMP responses including the status information is not limited to the condition of S110 of FIG. 3 and the condition of S110 and S140 of FIG. 6, and various conditions may be used. For example, the specific condition may include a condition that the IP address of the transmission source of the SNMP request is a predetermined IP address.

(5) In the process of FIG. 5, the processes (S325, S360 to S370) for periodically updating the information of the specific item may be omitted. In the embodiment of FIG. 4F, the history table T3 prescribes different set date/time (that is, the transmission timing of the collection job) for each management device. Alternatively, the transmission timing may be common to a plurality of management devices.

(6) In the above-described embodiment, the date/time is used in order to specify various timings (for example, transmission timing, reception timing, and the like). Alternatively, the timing may be specified by using the timing without using the date. The time interval of repeated SNMP requests from the management device (for example, the management servers 300 and 320) is usually shorter than one day. Therefore, even when the date is omitted, the timing can be specified appropriately by using the timing. The timer 160 may be a device that measures an elapsed time from the reference timing instead of the device that measures the current date/time. The reference timing may be, for example, timing when the power of the terminal device 100 is turned on. The timing may be specified by using the elapsed time measured by the timer 160.

(7) A response transmitting function of transmitting the SNMP response of S120 and S250 of FIG. 3 to the external device may be a function incorporated into a system (for example, an operating system) which operates on the terminal device 100. The program for executing the processing in FIG. 3 may be configured so as to cause the CPU 110 to realize a process of supplying an instruction to the response transmitting function as a process for transmitting the SNMP response. Alternatively, the program for executing the process in FIG. 3 may be configured so as to cause the CPU 110 to realize a process of transmitting the SNMP response as a process for transmitting the SNMP response.

(8) A request transmitting function (for example, the function of the print spooler B150 in FIG. 2) of transmitting the collection job requesting for the status information of S340 and S360 in FIG. 5 to the printer 200 may be a function incorporated into a system (for example, an operating system) which operates on the terminal device 100. The program for executing the process in FIG. 5 may be configured so as to cause the CPU 110 to realize a process of supplying an instruction to the request transmitting function as a process for transmitting the collection job. Alternatively, the program for executing the process in FIG. 5 may be configured so as to cause the CPU 110 to realize a process of transmitting the collection job as a process for transmitting the collection job. The format of the request for status information accepted by the printer 200 may be any other format instead of the format using the printing job. For example, the printer 200 may accept a request for the status information in accordance with another protocol different from the protocol for the printing job. The printer 200 may accept a request described in a markup language (for example, Extensible Markup Language (XML) or the like). Similarly, the format of the response including the status information transmitted by the printer 200 may also be any format.

(9) In the terminal device 100 of the above-described embodiment, the first type interface that communicates with the management servers 300 and 320 is the network IF 180, and the second type interface that communicates with the printer 200 is the USB IF 170. Thus, the communication standard conformed by the communication of the first type interface differs from the communication standard conformed by the communication of the second type interface. Alternatively, for example, the communication standard conformed by the communication of the first type interface and the communication standard conformed by the communication of the second type interface may be the same communication standard (for example, Ethernet (registered trademark)).

In this case, the terminal device 100 may include the first network IF as the first type interface and the second network IF as the second type interface. Then, the first network IF may be connected to the Internet to be connected to the management servers 300 and 320 via the Internet. The second network IF may be connected to the local area network to be connected to the network printer via the local area network. The terminal device 100 receives the status information from the printer by transmitting the SNMP request to the network printer according to the transmission timing. In response to the SNMP request from the management servers 300 and 320, the terminal device 100 may transmit the SNMP response including the status information to the management servers 300 and 320.

The first network IF may be a wired interface conforming to the Ethernet (registered trademark) standard, and the second network IF may be a wireless interface conforming to the Wi-Fi standard. On the contrary, the first network IF may be a wireless interface conforming to the Wi-Fi standard, and the second network IF may be a wired interface conforming to the Ethernet (registered trademark) standard. The first network IF may be a wireless interface conforming to the Wi-Fi standard, and the second network IF may be a wireless interface conforming to the Wi-Fi Direct standard.

(10) The format of a request for status information accepted by the terminal device 100 may be an arbitrary format instead of the format of the SNMP request. For example, the terminal device 100 may accept a request for status information from the management device in accordance with a dedicated protocol. The terminal device 100 may accept a request described in a markup language (for example, Extensible Markup Language (XML) or the like). Similarly, the format of the response including the status information transmitted by the terminal device 100 may be an arbitrary format instead of the format of the SNMP response.

(11) Instead of the printer 200, the function executing device to be managed by the terminal device 100 may be an arbitrary device that executes a specific function such as a scanner or a file server. The terminal device 100 may manage the status information (for example, the number of scans and error information) of the scanner and the status information (for example, free space and error information) of the file server.

(12) In each of the above-described embodiments, a portion of the configuration realized by hardware may be replaced with software, and on the contrary, a portion or the whole of the configuration realized by software may be replaced with hardware. For example, the function of S245 in FIG. 3 may be realized by a dedicated hardware circuit.

When a portion or the whole of the functions of this disclosure is realized by a computer program, the program may be provided in a form stored in a computer-readable recording medium (for example, a non-temporary recording medium). The program may be used in a state of being stored in a recording medium (a computer readable recording medium) that is the same as or different from that of the providing time. The "computer-readable recording medium" is not limited to a portable recording medium such as a memory card or a CD-ROM, but may include an internal storage device such as various ROMs inside a computer or an external storage device such as a hard disk drive connected to a computer.

Although this disclosure has been described based on the embodiments and the modified examples, the embodiments of the invention described above are intended to facilitate the understanding of the invention but does not limit this disclosure. The invention can be changed and improved without departing from the spirit of the invention, and equivalents thereof are included in this disclosure.

What is claimed is:

1. A non-transitory computer-readable medium having instructions to control a computer of a communication device, which includes a first type communication interface and a second type communication interface, to perform operations comprising;

receiving, from a management device, a first management request through the first type communication interface, the first management request being a request for first status information indicating a status of a function executing device, the function executing device being connected to the communication device through the second type communication interface;

receiving, from the management device, a second management request through the first type communication interface after receiving the first management request from the management device, the second management request being a new request for the first status information;

determining a transmission timing by using a first period between a reception timing of the first management request and a reception timing of the second management request, the transmission timing being a timing of transmitting, to the function executing device, a first status request for inquiring about the first status information through the second communication interface; and receiving, from the function executing device, information including the first status information in response to the first status request being transmitted to the function executing device through the second type communication interface in accordance with the determined transmission timing.

2. The non-transitory computer-readable medium according to claim 1, the instructions to control the computer of the communication device, to further perform operations comprising:

receiving, from the management device, a third management request through the first type communication interface after receiving the second management request, the third management request being a new request for the first status information, wherein in a case where the third management request is received, the computer in the determining determines the transmitting timing by using a second period between the reception timing of the second management request and a reception timing of the third management request.

3. The non-transitory computer-readable medium according to claim 1, wherein, in the determining of the transmission timing, the computer of the communication device performs:

specifying an acquisition period which is a period from transmission of the first status request to the function executing device until the information including the first status information from the function executing device is received, and determining, in a case where the transmission timing is determined by using the first period, the transmission timing as a timing which is earlier by the acquisition period or more than the timing specified based on the first period.

4. The non-transitory computer-readable medium according to claim 1, the instructions to control the computer of the communication device, to further perform operations comprising:

storing the information received by the first status receiving function in a storage device of the communication device; and transmitting, to the management device through the first type communication interface, information corresponding to the first status information among the information stored in the storage device, in a case where the request of the first status information is received from the management device through the first type communication interface.

5. The non-transitory computer-readable medium according to claim 4 wherein in the receiving of the first management request, the computer of the communication device determines whether or not a transmission source of the first management request is the management device satisfying a specific condition in a case where a request is received through the first type communication interface, and in a case where the transmission source of the first management request is determined not to be the management device that satisfies the specific condition, the information indicating the status of the function executing device is not transmitted to the transmission source of the first management request, and in a case where the transmission source of the first management request is determined to be the management device that satisfies the specific condition, the computer in the transmitting transmits, to the management device through the first type communication interface, the information corresponding to the first status information among the information stored in the storage device.

6. The non-transitory computer-readable medium according to claim 5, wherein in the receiving of the first management request, the computer determines whether or not the transmission source of the request is the management device by interpreting the request received through the first type communication interface.

7. The non-transitory computer-readable medium according to claim 1, the instructions to control the computer of the communication device, to further perform operations comprising:

executing, periodically and independently of the transmission timing, a process for transmitting to the function executing device a second status request for inquiring about a status of a specific item of the function executing device through the second type communication interface; and receiving, from the function executing device, third status information which is information transmitted by the function executing device in response to the second status request, the third status information indicating the status of the specific item of the function executing device.

8. The non-transitory computer-readable medium according to claim 1, wherein wherein, in the determining of the transmission timing, the computer of the communication device performs:

determining a first transmission timing as a transmission timing of transmitting a status request for inquiring the function executing device about status information requested by a first management device, and determining a second transmission timing as a transmission timing of transmitting a status request for inquiring the function executing device about status information requested by a second management device, the second transmission timing being different from the first transmission timing, the second management device being different from the first management device.

9. The non-transitory computer-readable medium according to claim 1, wherein the first type communication interface is an interface that performs communication in accordance with a first communication standard, and the second type communication interface is an interface that performs communication in accordance with a second communication standard different from the first communication standard.

10. The non-transitory computer-readable medium according to claim 9, wherein
the first communication standard is Internet Protocol, and
the second communication standard is Universal Serial Bus.

11. A communication device comprising:
a first type communication interface;
a second type communication interface;
a computer; and
memory storing instructions that, when executed by the computer, cause the communication device to perform operations comprising:
receiving, from a management device, a first management request through the first type communication interface, the first management request being a request for first status information indicating a status of a function executing device, the function executing device being connected to the communication device through the second type communication interface;
receiving, from the management device, a second management request through the first type communication interface after receiving the first management request from the management device, the second management request being a new request for the first status information;
determining a transmission timing by using a first period between a reception timing of the first management request and a reception timing of the second management request, the transmission timing being a timing of transmitting, to the function executing device, a first status request for inquiring about the first status information through the second communication interface; and
receiving, from the function executing device, information including the first status information in response to the first status request being transmitted to the function executing device through the second type communication interface in accordance with the determined transmission timing.

12. The communication device according to claim 11, the computer of the communication device perform operations comprising:
receiving, from the management device, a third management request through the first type communication interface after receiving the second management request, the third management request being a new request for the first status information, wherein
in a case where the third management request is received, the communication device in the determining determines the transmitting timing by using a second period between the reception timing of the second management request and a reception timing of the third management request.

13. The communication device according to claim 11, wherein, in the determining of the transmission timing, the computer of the communication device performs:
specifying an acquisition period which is a period from transmission of the first status request to the function executing device until the information including the first status information from the function executing device is received, and
determining, in a case where the transmission timing is determined by using the first period, the transmission timing as a timing which is earlier by the acquisition period or more than the timing specified based on the first period.

14. The communication device according to claim 11, the computer of the communication device perform operations comprising:
storing the information received by the first status receiving function in a storage device of the communication device; and
transmitting, to the management device through the first type communication interface, information corresponding to the first status information among the information stored in the storage device, in a case where the request of the first status information is received from the management device through the first type communication interface.

15. The communication device according to claim 14, wherein
in the receiving of the first management request, the computer of the communication device determines whether or not a transmission source of the first management request is the management device satisfying a specific condition in a case where a request is received through the first type communication interface, and
in a case where that the transmission source of the first management request is determined not to be the management device that satisfies the specific condition, the information indicating the status of the function executing device is not transmitted to the transmission source of the first management request, and
in a case where the transmission source of the first management request is determined to be the management device that satisfies the specific condition, the communication device in the transmitting transmits, to the management device through the first type communication interface, the information corresponding to the first status information among the information stored in the storage device.

16. A communication device according to claim 15, wherein
in the receiving of the first management request, the computer determines whether or not the transmission source of the request is the management device by interpreting the request received through the first type communication interface.

17. A communication device according to claim 11, the computer of the communication device perform operations comprising:
executing, periodically and independently of the transmission timing, a process for transmitting to the function executing device a second status request for inquiring about a status of a specific item of the function executing device through the second type communication interface; and
receiving, from the function executing device, third status information which is information transmitted by the function executing device in response to the second status request, the third status information indicating the status of the specific item of the function executing device.

18. A communication device according to claim 11, wherein wherein, in the determining of the transmission timing, the computer of the communication device performs:

determining a first transmission timing as a transmission timing of transmitting a status request for inquiring the function executing device about status information requested by a first management device, and determining a second transmission timing as a transmission timing of transmitting a status request for inquiring the function executing device about status information requested by a second management device, the second transmission timing being different from the first transmission timing, the second management device being different from the first management device.

19. A communication device according to claim 11, wherein the first type communication interface is an interface that performs communication in accordance with a first communication standard, and the second type communication interface is an interface that performs communication in accordance with a second communication standard different from the first communication standard.

20. A communication method of controlling a communication device, which includes a first type communication interface and a second type communication interface, the method comprising;

receiving, from a management device, a first management request through the first type communication interface, the first management request being a request for first status information indicating a status of a function executing device, the function executing device being connected to the communication device through the second type communication interface;

receiving, from the management device, a second management request through the first type communication interface after receiving the first management request from the management device, the second management request being a new request for the first status information;

determining a transmission timing by using a first period between a reception timing of the first management request and a reception timing of the second management request, the transmission timing being a timing of transmitting, to the function executing device, a first status request for inquiring about the first status information through the second communication interface; and receiving, from the function executing device, information including the first status information in response to the first status request being transmitted to the function executing device through the second type communication interface in accordance with the determined transmission timing.

* * * * *